3,102,129
PROCESS FOR PRODUCING MONOGLYCERIDES OF FATTY ACIDS
Hermann Birnbaum and Joseph Lederer, Pittsburgh, Pa., assignors to Hachmeister-Incorporated, Pittsburgh, Pa., a corporation of Pennsylvania
No Drawing. Filed May 19, 1961, Ser. No. 111,183
5 Claims. (Cl. 260—410.7)

This invention relates to a recycling process for producing monoglycerides from fats and oils.

A number of processes are commercially available for producing from the reaction product of fats or oils with glycerol, an end product with a high content of fatty acid monoglyceride. As is well known these processes usually begin by heating a fat or oil or mixtures (all being essentially triglycerides of fatty acids) with an excess of glycerol in the presence of a catalyst, such as sodium hydroxide, whereby there results a mixture comprising varying proportions of the fatty acid monoglyceride and fatty acid diglyceride, with small amounts of unreacted fat or oil and a substantial quantity of unreacted glycerol. The catalyst, various naturally present organic compounds, water and impurities are also present. By subjecting this reaction product mixture to distillation, most of the glycerol is initially stripped off. This process is set forth in Birnbaum Patent 2,875,221. The remainder of the reaction product is often subjected to molecular distillation at low temperatures to recover a high proportion of the fatty acid monoglyceride as a concentrate having well over 90% of monoglyceride content. The residue from the molecular still amounts to as much as from 30% to 50% of the weight of the reaction product originally introduced into it.

Since the molecular still residue comprises nearly 99% by weight of various fatty acid glycerides, it is economically desirable to recycle it to the reaction vessel to be converted to monoglycerides by reaction with more glycerol and fat or oil. In the still residue there is also present the catalyst or a conversion product of the catalyst.

The alkalinity and acidity of the reaction product in various stages is critical. The reaction product is necessarily alkaline, i.e. pH above 7, preferably 8 and higher when the primary interesterification to a monoglyceride takes place at elevated temperatures, the reaction being slow and poor when the pH is below 7. However, once the monoglyceride is formed, and the product is cooled to a lower temperature, the pH must be maintained below 7, preferably from 6 to 5, to prevent reversion of the monoglyceride. During the stripping of the glycerol and the molecular distillation an acidified mixture is mandatory. Unless the mixture is definitely acid, the yield of monoglyceride will be severely reduced.

However, it has been found that the residue from the molecular still, either alone or mixed with fresh fat, does not react efficiently with glycerol to give a high yield of fatty acid monoglycerides. Further, with continued recycling of the molecular still residue progressively lower proportions of fatty acid monoglyceride are obtained. The following Table I shows the alpha fatty acid monoglyceride content present in each of six successive esterification cycles, wherein the second through the sixth esterification comprised the recycle of the molecular still residue with fresh fat to a constant total weight with the same amount of alkali catalyst added:

TABLE I

*Reactants—Parts by Weight*

| Esterification | Residue | Fresh Lard | Alpha-monoglyceride Content, Percent |
|---|---|---|---|
| 1st | 0 | 2,100 | 55.7 |
| 2nd | 840 | 1,260 | 53.6 |
| 3rd | 1,190 | 910 | 45.9 |
| 4th | 1,030 | 1,070 | 12.2 |
| 5th | 1,415 | 685 | 9.9 |
| 6th | 1,500 | 600 | 7.4 |

It will be observed from the data in Table I that while moderate decreases in monoglyceride content occurred in the second and third esterifications as compared to the first esterification results, even more drastic decreases in the monoglyceride content were obtained in the fourth and subsequent esterifications such that the entire operation was economically jeopardized. Consequently, the molecular still residues are not desirable for recycling since they severely deteriorate the output of fatty acid monoglyceride.

The object of this invention is to provide a recycling process in which molecular still fatty acid glyceride residues are treated to remove catalyst conversion products whereby the residues can be reacted with additional glycerol and fatty acid triglycerides to yield a consistently high monoglyceride content.

A further object of the invention is to provide an efficient and economical process for producing fatty acid monoglycerides by reacting fatty acid triglycerides with glycerol in the presence of an alkaline catalyst to a pH of well above 7 to yield a high monoglyceride content reaction product, neutralizing the catalyst with an acid to a pH of well below 7, so that glycerol may be stripped off and monoglyceride may be recovered in high yield in a molecular still without significant reversion of the monoglyceride, then subjecting the molecular still residue to treatment to remove substantially all the acidified catalyst conversion product, and recycling the treated still residue with additional fatty acid triglyceride, glycerol and alkali catalyst to maintain a high yield of fatty acid monoglyceride.

Other objects of the invention will in part be obvious and will in part appear hereinafter. For a better understanding of the nature and objects of the invention reference should be had to the following detailed description.

In accordance with the invention, the following recycle process has been found to consistently yield a high fatty acid monoglyceride content:

(a) One part of substantially anhydrous glycerol is reacted with from one to three parts of a polyglyceride of a fatty acid (e.g., oil, fats and mixtures of two or more) in the presence of from 0.1% to 2%, based on the weight of the glycerol, of anhydrous alkali, to bring the mixture to a pH of substantially above 7, by heating rapidly to a temperature of from 475 F. to 525° F., (b) Holding the reaction mixture at this temperature for at least 15 minutes to obtain a substantially optimum high yield of fatty acid monoglyceride, (c) Acidifying the reaction product to a pH substantially below 7, and preferably 6 or less by an excess of concentrated phosphoric acid to convert the alkali catalyst to the alkali metal acid phosphate salt, (d) Cooling the reaction mixture rapidly to a temperature of from 200° F. to 350° F. to minimize reversion of the monoglyceride, (e) Stripping most of the free glycerol from the mixture, without removing any amount of the acid or alkali acid phosphate salt, (f) Vacuum distilling the stripped reaction product to yield a distillate having a high monoglyceride content, i.e. 90% or higher, (g) Treating the molecular still residue, which amounts to as much as 50% of the reaction product, to remove substantially all of the alkali metal acid phosphate salt therefrom, and (h) Recycling the treated residue to reaction step (a) by adding more fatty acid triglyceride and glycerol and alkaline catalyst.

The fats and oils suitable for use in the process are triglycerides of fatty acids well known in the art—they may be of both animal and vegetable origin. Thus, lard, tallow, cottonseed oil, olive oil, soyabean oil, coconut oil, fish oil, palm oil and whale oil may be treated. They comprise the triglyceride esters of fatty acids having from 8 to 26 carbon atoms, preferably those having 12 to 20 carbon atoms. The fat or oil should be free from water or moisture. Therefore, heating, preferably under a vacuum, is applied to it before use in the process.

The alkali catalyst is preferably sodium hydroxide or potassium hydroxide. The catalyst preferably should be in a fine anhydrous grain or flake form.

Anhydrous glycerol is preferred for the practice of the process of this invention. It is readily available on the market.

The phosphoric acid is preferably 75% to 85% concentrated, though it may be somewhat less concentrated or a stronger acid may be used. It is added in an amount sufficient not only to neutarlize the alkali catalyst, but to produce the alkali metal dihydrogen phosphate, and the reaction mixture has a pH of about 6 or less. The phosphate salt should not be removed or filtered off after step (d), as is disclosed in Patent 2,875,221 because it is required to maintain the desired acidity, i.e. from pH 5 to just below a pH of 7, in the reaction mixture.

From the molecular still there is obtained from 35% to 50% of unevaporated residue. Tests have shown that this residue comprises some 99% of various fatty acid glycerides, and less than 1% by volume of the alkali metal dihydrogen phosphate therein. The alkali metal dihydrogen phosphate salt is dispersed as an extremely fine precipitate therein.

Various procedures may be applied to the residue to remove the alkali metal dihydrogen phosphate therefrom. Centrifuging is preferred for the separation of the acidified catalyst therefrom. Centrifugal separation has given good results in effecting substantially complete removal of the converted catalyst material therefrom. In practice, the residue from the molecular still or stills is passed into a centrifugal separator as fast as it is produced and the small volume of the deleterious alkali metal acid phosphate is selectively extracted and discarded.

In some cases, a filter aid such as diatomaceous silica is added to the residue from the molecular still, and when passed through a filter press, the fine alkali metal acid phosphate particles are retained in the filter cake which is discarded.

Once freed from the acidic catalyst conversion products, the residue is eminently satisfactory for recycling and further interesterification with glycerol in the presence of alkali catalyst.

While phosphoric acid is preferred for converting the alkali reaction product to the acid state, other mineral acids such as sulfuric acid and hydrochloric acid, or mixtures thereof, can be employed.

A series of recycle runs on molecular still residues was carried out. An excess of glycerol was added to the residue. These tests involved removal by decantation of the alkali metal acid phosphate layer which developed in the residue on standing. The following Table II indicates the results of these tests:

TABLE II

| Esterification | Percent Alpha Monoglyceride | Acid Value of Treated Still Residue Used in the Run |
|---|---|---|
| Initial | 59.2 | |
| 2nd | 61.8 | 1.91 |
| 3rd | 47.6 | 3.17 |
| 4th | 62.1 | 0.53 |

It will be observed that as the acidity of the treated still residue is higher, the percent of alpha monoglyceride decreases. The high proportion of alpha monoglyceride in the reaction product is noteworthy and is highest on the 4th esterification.

The process of this invention may be operated as continuous process, following the general procedures of Patent 2,875,221, or as a batch process.

The following example is illustrative of the invention:

500 parts by weight of anhydrous glycerol heated to 325° F. is admixed with 10 parts by weight of anhydrous sodium hydroxide and is intimately admixed with 1000 parts by weight of lard fat which has been deaerated and moisture freed by heating to 425° F. under a vacuum. To this mixture is introduced 850 parts by weight of molecular still residue which was centrifuged to free it of any alkali metal phosphate salt and whose pH is about 7. The still residue comprises approximately 13.5% monoglyceride, 61.5% diglyceride and 25% triglyceride of fatty acids. The mixture is heated to a temperature of from 475° F. to 500° F. by passing it in thin films over a drum heater and passed into a holding tank where it is held for some 30 minutes. Interesterification occurs with a high monoglyceride content being present. Thereafter 30 parts of 85% phosphoric acid is introduced into the mixture to acidify it to a pH of approximately 6. The acidified mixture is cooled rapidly to a temperature of approximately 275° F. in a minute or two as the acid is being slowly added to it. A water cooled drum to which the films of the reaction product are applied concurrently with acid treatment thereof gives excellent results. The reaction products at 275° F. is stripped of glycerol under vacuum. The treated acidified product contains over 60% alpha monoglyceride.

The glycerol stripped, acidic reaction product is then subjected to molecular distillation at an absolute pressure of the order of 10 microns while at a temperature of from 275° F to 325° F. A distillate comprising over 92% alpha monoglyceride, 3% diglyceride and 1% triglyceride of the fatty acids is obtained. Very little reversion of the monoglyceride content occurs in the process because of the acidity of the reaction product. Approximately 40% of the reaction product fed into the molecular still is obtained as a residue.

The molecular still residue is centrifuged as it collects from the still and a fraction amounting to about 1% by volume comprising alkali metal dihydrogen phosphate is discarded. The remainder of the centrifuged residue, which now has a pH of nearly 7, is recycled to the original esterification reaction for admixture with more fat, glycerol and alkali.

It will be understood that the above detailed description is illustrative of the invention.

We claim:

1. In a recycling process for preparing monoglyceride esters of fatty acids, the steps comprising (a) reacting one part of substantially anhydrous glycerol with from one to three parts of a polyglyceride of a fatty acid in the presence of from 0.1% to 2%, based on the weight of the glycerol, of anhydrous alkali, the mixture being heated rapidly to a temperature of from 475° F. to 525° F., (b) holding the mixture at this temperature for at least 15 minutes to obtain a high proportion of monoglyceride, (c) acidifying the reaction product to a pH of below 7 by adding an excess of concentrated phosphoric acid to convert the alkali to the alkali metal acid phosphate, (d) cooling the reaction mixture rapidly to a temperature of from 200° F. to 350° F. to minimize reversion of the monoglyceride, (e) stripping free glycerol from the mixture, (f) vacuum distilling the reaction product while acidified to recover a high proportion of the monoglyceride therefrom, without appreciable reversion during distillation, (g) removing by mechanical separations substantially all of the alkali metal acid phosphate salt from the residue of the vacuum distillation, (h) recycling the treated residue to the reaction step (a) to be combined with added fatty acid polyglyceride and the whole to be reacted with additional glycerol and alkali metal catalyst with substantially equal efficiency of conversion to monoglyceride.

2. The process of claim 1, wherein in step (g) the residue is subjected to filtration to remove the alkali metal acid phosphate.

3. The process of claim 1, wherein in step (g) the residue is subjected to centrifuging to remove the alkali metal acid phosphate.

4. The process of claim 1, wherein in step (g) the residue is subjected to decantation of a layer that appears between the fatty phase and a lower glycerol layer, the first mentioned layer containing most of the alkali metal acid phosphate salt.

5. In the process of recovering a high yield of monoglyceride and producing an effectively recyclable fatty acid polyglyceride residue from an alkali catalyst reacted glycerol-fatty acid polyglyceride product which contains a high proportion of monoglyceride, the steps comprising adding sufficient concentrated phosphoric acid to convert the alkali catalyst to essentially alkali metal dihydrogen phosphate and to bring the reaction product to a pH of below 7, bringing the acidified product rapidly to a temperature not below about 200° F. and in excess of 350° F., vacuum stripping free glycerol from the reaction product, then separating essentially all of the monoglyceride by molecular distillation of the stripped reaction product without conversion thereof to any significant extent due to its acidified state, finally treating the residue to remove therefrom substantially all of the alkali metal dihydrogen phosphate, thereby to produce a residue that can be efficiently reacted further with added glycerol to give a high conversion to monoglyceride.

References Cited in the file of this patent

UNITED STATES PATENTS

| | | |
|---|---|---|
| 2,634,234 | Kuhrt | Apr. 7, 1953 |
| 2,634,278 | Kuhrt | Apr. 7, 1953 |
| 2,875,221 | Birnbaum | Feb. 24, 1959 |